United States Patent [19]

Kesler

[11] Patent Number: 4,470,373

[45] Date of Patent: Sep. 11, 1984

[54] APPARATUS AND METHOD FOR PRACTICING CALF-ROPING

[76] Inventor: Greg Kesler, 425 Cedar St., Evanston, Wyo. 82930

[21] Appl. No.: 489,404

[22] Filed: Apr. 28, 1983

[51] Int. Cl.$^3$ .............................................. A01K 1/00
[52] U.S. Cl. ................................... 119/15.6; 119/29; 119/98
[58] Field of Search .................... 119/15.5, 29, 15.6, 119/98; 273/359

[56] References Cited

U.S. PATENT DOCUMENTS

| | | | |
|---|---|---|---|
| 2,560,116 | 7/1951 | Lucas et al. | 119/15.5 |
| 2,819,900 | 1/1958 | Brackett | 273/1 |
| 2,821,960 | 2/1958 | Rudolph | 119/29 |
| 3,406,969 | 10/1968 | Tisdell et al. | 273/1 |
| 4,133,295 | 1/1979 | Jones | 119/15.5 R |

Primary Examiner—Hugh R. Chamblee
Attorney, Agent, or Firm—H. Ross Workman; Rick D. Nydegger; Berne S. Broadbent

[57] ABSTRACT

An apparatus and method for practicing calf-roping on live calves without the use of a roping horse. The novel calf-roping practice apparatus of the present invention comprises a rectangular chute which may be connected to the cattle chute of a stockyard or corral. The chute of the apparatus has a spring-loaded forward gate, which may be opened by pulling on a lever. The apparatus further comprises a take-up mechanism which is connected to the roping rope and which removes the slack in the rope after a calf has been roped. The apparatus is surmounted by a surface which simulates a horse's back, such that the user may secure his saddle thereon. The apparatus of the present invention may also include a spring-loaded neck mechanism which simulates a horse's neck and head.

In use, the user ties his saddle on the apparatus and ties a string between one of the stirrups of the saddle and the lever which triggers the spring-loaded forward gate. The user then connects his rope to the take-up device of the apparatus. Following these preliminary preparations, a calf is placed in the chute of the apparatus and the roper climbs on the apparatus and sits in the saddle. When the roper is ready to rope the calf, he kicks his stirrup to the rear, thereby pulling on the string and lever so as to trigger the spring mechanism which opens the forward gate. As the calf runs out of the chute, the roper throws the rope around the neck of the calf. The take-up device of the apparatus thereafter removes any slack in the rope, and the roper may dismount the saddle in the same manner he would a horse during an actual calf-roping competition.

31 Claims, 4 Drawing Figures

APPARATUS AND METHOD FOR PRACTICING CALF-ROPING

BACKGROUND

1. The Field of the Invention

This invention relates to apparatus and methods for practicing the art and skills of calf-roping and, more particularly, to a novel apparatus and method for practicing roping live calves without the use of a roping horse.

2. The Prior Art

Due in large part to rodeos and other competitions, the art of calf-roping has become quite popular among both spectators and potential competitors. A person's success at calf-roping depends upon his or her roping skills, stamina, and timing, as well as upon the skill and training of the roping horse.

Typically, calf-roping is performed by a rider on horseback. The rider, swinging a rope, approaches a running calf from behind. When he is in the correct position, the rider throws the rope around the neck of the calf and simultaneously pulls the roping horse back such that the horse begins to stop. The calf continues to run, but it is soon pulled to the ground as it reaches the end of the rope, which has been tied to the horn of the roper's saddle. Any slack in the rope is thereafter removed by the roping horse, which backs up so as to maintain constant tension in the rope. At the same time, the rider dismounts the horse and, being assisted by the tension in the rope, flips the calf onto its back. The calf-roping event is then completed by the rider tying the legs of the calf.

In order to become a skillful calf-roper, one must perfect several difficult skills and techniques. For example, it is first necessary to learn how to throw a loop of rope, or lasso, around an object. One must then learn how to control his or her throws while mounted on a horse. As the roper becomes more skillful, timing becomes critical; and a roper must practice throwing the rope and stopping the horse quickly and accurately and without following the running calf for any considerably distance. Finally, the roper must learn to dismount the horse in such a manner so as not to lose momentum while moving toward the roped calf.

One of the major problems encountered by those who desire to become skillful calf-ropers is obtaining sufficient practice time. A person's roping skills can, of course, be perfected to a degree by practicing roping inanimate objects. However, it is virtually impossible to perfect one's skills of timing and accuracy without considerable practice time roping live animals. Naturally, it is most desirable to obtain as much practice as possible roping from horseback. However, a single roping horse cannot be used for roping more than about six to eight calves a day without overdoing, and perhaps ruining, the horse. As mentioned above, the horse plays an important part in calf-roping and must be highly trained. Consequently, a good roping horse is quite expensive, and it is uncommon for most calf-ropers to be able to afford more than one roping horse. Thus, calf ropers have often been limited to six to eight live roping sessions a day, which is not adequate to develop the needed skills.

In order to help calf-ropers adequately practice their skills, those skilled in the art have attempted to develop apparatus and methods for practicing calf-roping which simulate to a certain degree an actual calf-roping experience. Typically, these prior art devices comprise both a mechanical horse and a mechanical calf, one or both of which are attached to a long, endless chain and are thereby capable of being propelled for a distance over the ground surface. When using these prior art devices, the rider surmounts the mechanical horse and thereafter practices roping the mechanical calf. Although these prior art devices may be helpful in giving a calf-roper additional practice time, they have proven to be inadequate in several respects.

First, these prior art devices for practicing calf-roping are generally quite complex and expensive. They require large, expensive motors and long chains to propel the mechanical animals, and the mechanical animals may also be quite expensive. Moreover, these devices have typically required some degree of on-going maintenance, which further adds to the expense of these devices.

In addition, these prior art devices are generally quite large and are difficult, if not impossible, to transport from one place to another. In order to provide the needed stability and support for the component parts, these prior art devices are typically mounted to some suitable type of permanent foundation. Even in those cases where the prior art type devices may be mounted to a temporary support structure, however, transportation of such devices may be quite tedious and time consuming. Consequently, these prior art devices are impractical for use on the road or as a warm-up device immediately before a competition.

Also, the prior art calf-roping practice devices have only a single use and serve no practical purpose on a ranch or in a stockyard when the device is not being used to practice calf-roping. This further adds to the expense of the device and makes the device somewhat undesirable as a ranch accessory.

Further, these prior art calf-roping practice devices do not adequately simulate an actual roping experience. In these devices, both the horse and the animal are typically propelled in a straight, predictable path. Thus, the rider obtains little practice in anticipating movements of the calf and thereby sharpening his timing and accuracy. Also, although some of the devices are constructed to permit the mechanical calf to fall or stop after being roped, none of the devices simulate the action of a roping horse in taking up the slack in the rope after the calf has been roped and in assisting the calf roper in turning the calf onto its back. Thus, these prior art practice devices provide little help in allowing the calf-roper to practice the final stages of the calf-roping event by dismounting the horse, turning the calf into its back, and tying the feet of the calf together.

Due to the above mentioned inadequacies, these prior art devices have generally not been considered to be successful as serious tools for perfecting calf-roping skills. Therefore, they have not been generally used by calf-ropers and are not considered adequate to help calf-ropers obtain the additional practice time which is needed to perfect their calf-roping skills.

Accordingly, it would be an improvement in the art to provide an apparatus for practicing calf-roping which is inexpensive to manufacture and maintain. It would also be an improvement in the art to provide an apparatus for practicing calf-roping which is easily transported from one place to another and which may be easily used as a warm-up device before a calf-roping competition. In addition, it would be an improvement in the art to provide an apparatus for practicing calf-roping which may be used on a ranch or in a stockyard without occupying considerable space. Additionally, it would be an improvement in the art to provide an apparatus for practicing calf-roping which may serve a useful function on a ranch or in a stockyard, in addition to its function as a calf-roping practice device. Further, it would be an improvement in the art to provide an apparatus for practicing calf-roping, wherein the user is roping a real calf under simulated roping conditions. It would also be an improvement in the art to provide a method for practicing calf-roping on real calves which does not require the use of an expensive roping horse. Such a device and method is disclosed and claimed herein.

BRIEF SUMMARY AND OBJECTS OF THE INVENTION

The present invention is directed to apparatus and methods for practicing calf-roping on live calves without the use of a roping horse. The novel calf-roping practice apparatus of the present invention comprises a rectangular chute which may be connected to the cattle chute of a stockyard or corral. The chute of the apparatus has a spring-loaded forward gate, which may be opened by pulling on a lever. The apparatus further comprises a take-up mechanism which is connected to the roping rope and which removes the slack in the rope after a calf has been roped. The apparatus is surmounted by a surface which simulates a horse's back, such that the user may secure his saddle thereon. The apparatus of the present invention may also include a spring-loaded neck mechanism which simulates a horse's neck and head.

In use, the user secures his saddle on the apparatus and ties a string between one of the stirrups of the saddle and the lever which triggers the spring-loaded forward gate. The user then connects his rope to the take-up device of the apparatus. Following these preliminary preparations, a calf is placed in the chute of the apparatus, and the roper climbs on the apparatus and sits in the saddle. When the roper is ready to rope the calf, he kicks his stirrup to the rear, thereby pulling on the string and lever so as to trigger the spring mechanism which opens the forward gate. As the calf runs out of the chute, the roper throws the rope around the neck of the calf. The take-up device of the apparatus thereafter removes any slack in the rope, and the roper may dismount the saddle in the same manner he would a horse during an actual calf-roping competition.

In order to facilitate transporting the apparatus of the present invention, the apparatus may be provided with suitable detachable wheels or may be constructed to as to attach to a suitable trailer. The apparatus may also be constructed so as to be capable of being completely disassembled such that the apparatus may be stored and/or transported in a relatively compact area. Additionally, the take-up mechanism, the spring loaded neck mechanism, and the surface which simulates a horse's back may be removed from the chute of the apparatus. Thus, the chute may be used alone as a normal calf chute when the apparatus is not being used for calf-roping practice.

It is, therefore, a primary object of the present invention to provide an apparatus and method for practicing calf-roping.

It is a further object of the present invention to provide an apparatus for practicing calf-roping which is inexpensive to manufacture and maintain.

It is still a further object of the present invention to provide an apparatus for practicing calf-roping which may be easily transported from one place to another.

It is another object of the present invention to provide an apparatus for practicing calf-roping which may be completely disassembled to facilitate transportation and/or storage.

It is still another object of the present invention to provide an apparatus for practicing calf-roping which may serve a useful purpose as a calf chute when it is not being used to practice calf-roping skills.

It is another object of the present invention to provide an apparatus for practicing roping live calves without the need for using a roping horse.

It is also an object of the present invention to provide an apparatus for practicing calf-roping which simulates the action of a roping horse in taking up the slack in the rope after the calf has been roped.

It is a further object of the present invention to provide an apparatus for practicing calf-roping which enables a roper to practice his timing and accuracy on live calves without the need of using a roping horse.

It is a still further object of the present invention to provide a method for practicing calf-roping on live calves which simulates a real roping experience but which does not necessitate using a roping horse.

These and other objects and features of the present invention will become more fully apparent from the following description and appended claims taken in conjunction with the accompanying drawings.

DETAILED DESCRIPTION OF THE PREFERRED EMBODIMENTS

It will be readily appreciated that the components of the present invention, as generally described and illustrated in the figures herein, could be arranged and designed in a wide variety of different configurations. Thus, the following more detailed description of the embodiment of the apparatus and method of the present invention as illustrated in FIGS. 1-4 is not intended to limit the scope of the invention as claimed, but is merely representative of one presently preferred embodiment of the invention.

Figure 1:
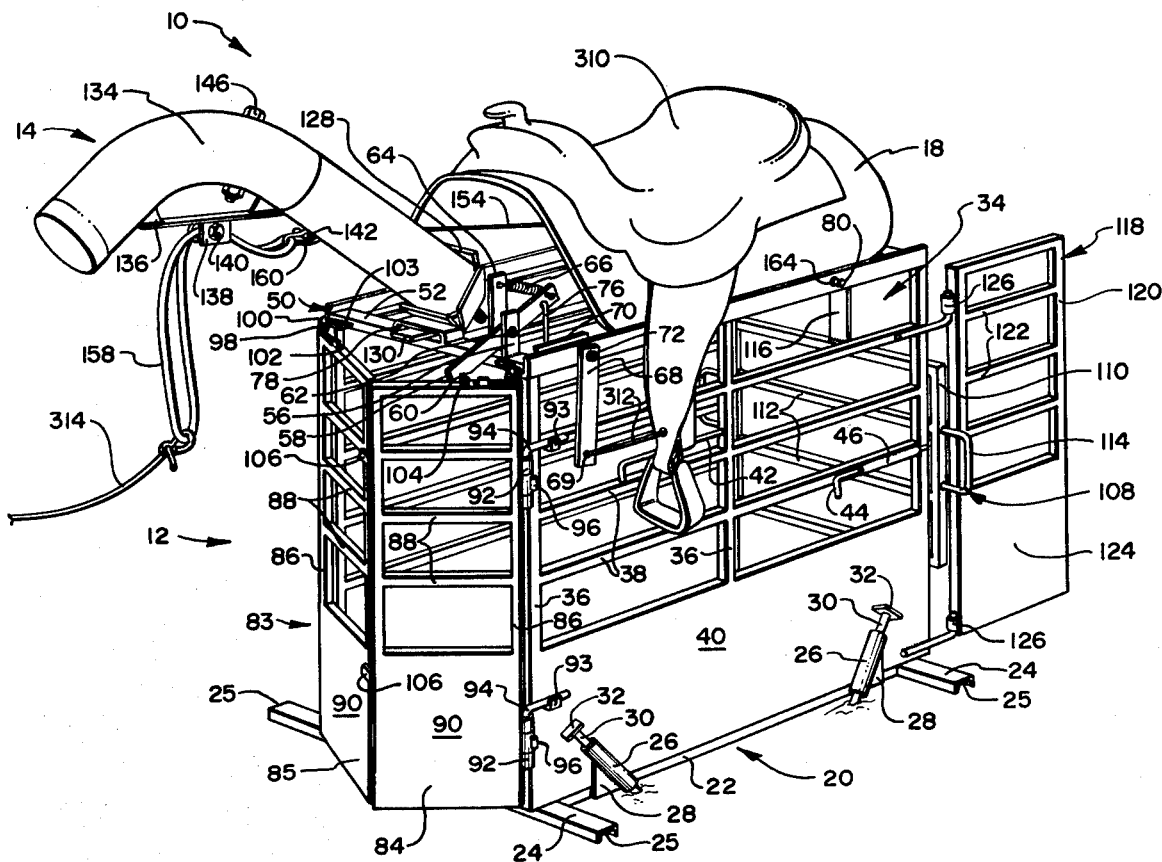
FIG. 1 is a perspective view of one presently preferred embodiment of the calf-roping practice apparatus of the present invention.

The calf roping practice apparatus of the present invention, generally designated 10, is seen in its entirety in FIG. 1. As shown in FIG. 1, calf-roping practice apparatus 10 comprises a calf chute, generally designated 12, a spring-mounted neck structure 14, a rope take-up means 16 (see FIG. 2), and a structure 18 which simulates a horse's back. When device 10 is being used, the user places his saddle 310 on top of structure 18. As hereinafter more fully described, with a calf confined within a calf chute 12, the user then mounts saddle 310 in a horse-like fashion and may practice his calf-roping skills.

Calf chute 12 of calf-roping practice apparatus 10 comprises a base 20, sides 34, a top 50, forward gate 83, rearward gate 108, and connecting panels 118. Each of these components is described separately below.

Base 20 of calf chute 12 comprises two, parallel support strips 22 which are perpendicularly connected to crossties 24. Importantly, the ends 25 of crossties 24 extend outwardly from support strips 22, thereby providing additional lateral support to calf-roping practice apparatus 10. As illustrated in FIG. 1, base 20 of calf chute 12 may also be provided with tubes 26 which are attached by gussets 28, or some other suitable means. Tubes 26 are mounted to base 20 so as to be capable of receiving stakes 30. Advantageously, stakes 30 may be provided with an enlarged head 32 to facilitate driving stakes 30 into the ground.

The two sides 34 of calf chute 12 are firmly connected to support strips 22 of base 20 so as to lie substantially in a vertical plane. Sides 34 comprise two or more vertical posts 36 which are connected by a plurality of horizontal rails 38. Advantageously, a shield plate 40 may be provided adjacent the lower portion of sides 34 to prevent the calf from sticking its legs through sides 34 of the chute. It should be noted that shield plate 40 may be provided either instead of or in addition to horizontal rails 38 adjacent the bottom of sides 34. Further, sides 34 may be provided with a suitable horizontal tie bar 42 for use in securing a saddle 310 to calf-roping practice apparatus 10, as set forth more fully below.

Pins 44 are provided adjacent the rearward edges of sides 34. As illustrated, pins 44 may be slidably received within sleeves 46 and may also be provided with a lip to prevent complete withdrawal of pins 44 from sleeves 46. Pins 44 serve to secure the rearward gate 108 of calf chute 12, as set forth more fully below.

The top 50 of calf chute 12 comprises a rectangular top frame 52 having a plurality of support straps 54 (see FIG. 4) connected thereto. Top 50 is also provided with a latching means adjacent the forward end thereof. As illustrated, this latching means comprises a clevis 56 which is securely mounted to top 50. A latch arm 58 having a hooked forward end 60 is rotatably connected to clevis 56 by a suitable securing means 62. One side of clevis 56 is elongated so as to form a spring securement post 64. A tension spring 66 (see FIG. 1) is connected between the top of spring securement post 64 and the rearward end of latch arm 58. Latch arm 58 is thus spring-biased such that its hooked forward end 60 assumes a downward orientation, as shown.

One end of each of two lever arms 68 and 70 is connected to a rod 72 (see FIG. 4) such that the substantially flat, strap-like lever arms lie substantially in parallel, vertical planes. Importantly, the two lever arms are connected to rod 72 such that, when outer lever arm 68 is positioned downwardly in a slightly forward position, as shown, inner lever arm 70 extends forward in a substantially horizontal direction. Also, outer lever arm 68 has one or more holes 69 therein for a purpose which will become more fully apparent from the discussion which follows.

Rod 72 is rotatably secured to the underside of top 50 by some suitable means. A coupling 76 is attached to the forward end of inner lever arm 70 and to the rearward end of latch arm 58. Thus, when outer lever arm 68 is pulled toward the rear of calf-roping practice apparatus 10, inner lever arm 70 and coupling 76 are pulled downwardly, thereby raising the forward end of latch arm 58.

As shown best in FIG. 1, forward gate 83 of calf chute 12 comprises two separate gate panels 84 and 85. Each of these gate panels comprises a substantially rectangular frame 86 having a plurality of horizontal bars 88 therein. Advantageously, each of the panels 84 and 85 of forward gate 83 is also provided with a shield plate 90 adjacent the lower portion thereof. Shield plate 90 serves substantially the same purpose as sheild plate 40 on sides 34.

Each panel of forward gate 83 is connected to the forward edge of one of the sides 34 of calf chute 12 in some suitable manner. For example, forward gate 83 may be secured to sides 34 by means of hinges 92. Advantageously, as set forth more fully below, forward gate 83 is connected to sides 34 so as to be removable. Thus, hinges 92 may be provided with removable hinge pins 94; and, in order to facilitate insertion and removal, hinge pins 94 may be L-shaped, as shown, with the outwardly extending portion of hinge pins 94 being secured by a suitable bracket 93. In addition, hinges 92 may be provided with suitable stops 96 to prevent forward gate 83 from opening beyond a certain point. For example, stops 96 may be positioned so as to prevent forward gates 83 from opening beyond the point where they are parallel to sides 34.

Figure 2:
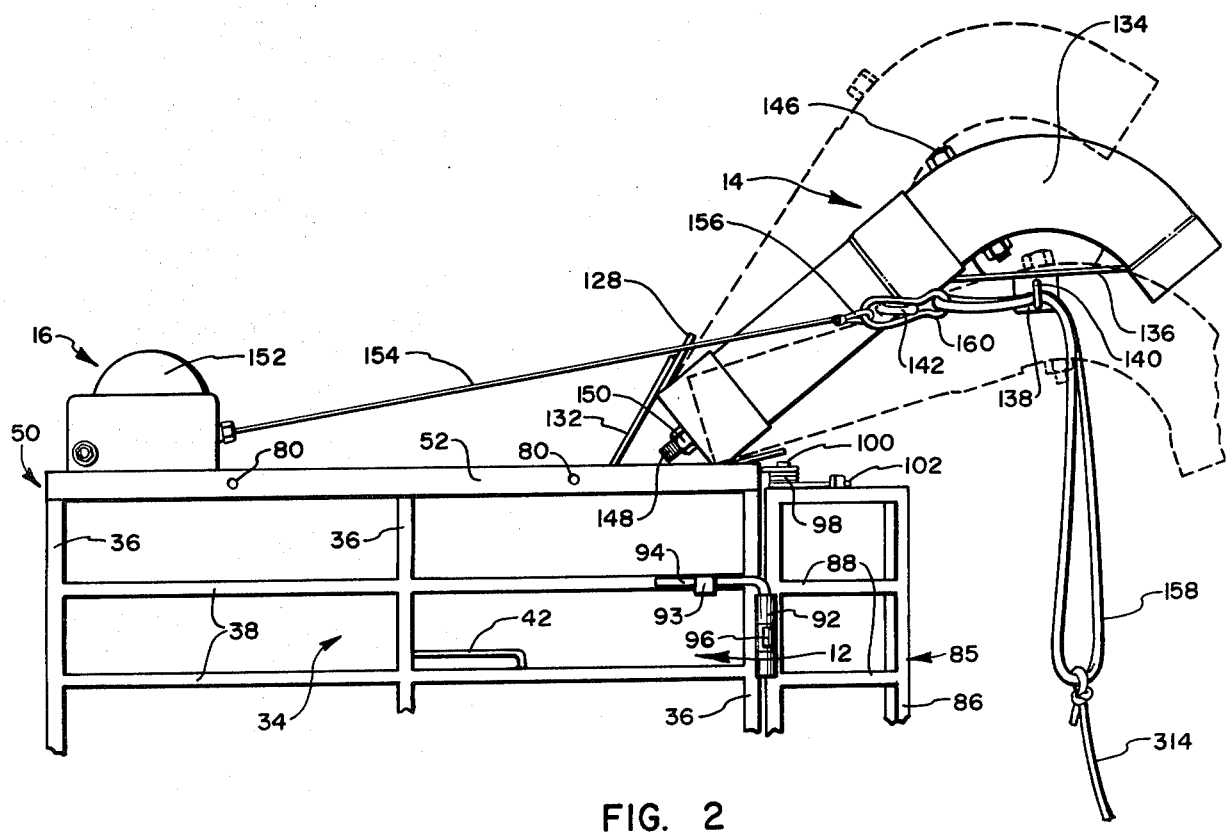
FIG. 2 is a partial side elevational view of the calf-roping practice apparatus of the present invention showing one presently preferred embodiment of the apparatus' take-up mechanism.

Each panel of forward gate 83 is spring-biased toward an open position. This biasing may be accomplished in any suitable manner. For example, as depicted in FIGS. 1 and 2, each panel of forward gate 83 may be provided with a torsion spring 98 which is mounted on a suitable post 100. One end 102 of torsion spring 98 may then be attached to the respective forward gate panel, and the other end 103 of torsion spring 98 may be positioned so as to contact the forward end of top 50 of calf chute 12. Thus, when panels 84 and 85 of forward gate 83 are in a closed position, torsion springs 98 exert a force on the forward gate panels so as to tend to force forward gate 83 open.

The left panel 84 of forward gate 83 is also provided with a latch plate 104 adjacent the top thereof. Importantly, latch plate 104 is positioned so as to engage the hooked end 60 of latch arm 58 when panel 84 is in a closed position. Panel 84 of forward gate 83 is further provided with one or more tabs 106 which extend from the outward side thereof. Thus, forward gate 83 may be secured in a closed position by first closing forward gate panel 85 and thereafter closing and latching forward gate panel 84. Left gate panel 84 is thus secured by latch arm 58, while right gate panel 84 is secured by tabs 106. When it is thereafter desired to open forward gate 83, one need merely pull outer lever arm 68 toward the rearward end of calf chute 12. Such action causes the forward end of latch arm 58 to be lifted, thereby releasing left forward gate panel 84 and permitting both left panel 84 and right panel 85 to spring open.

Figure 4:
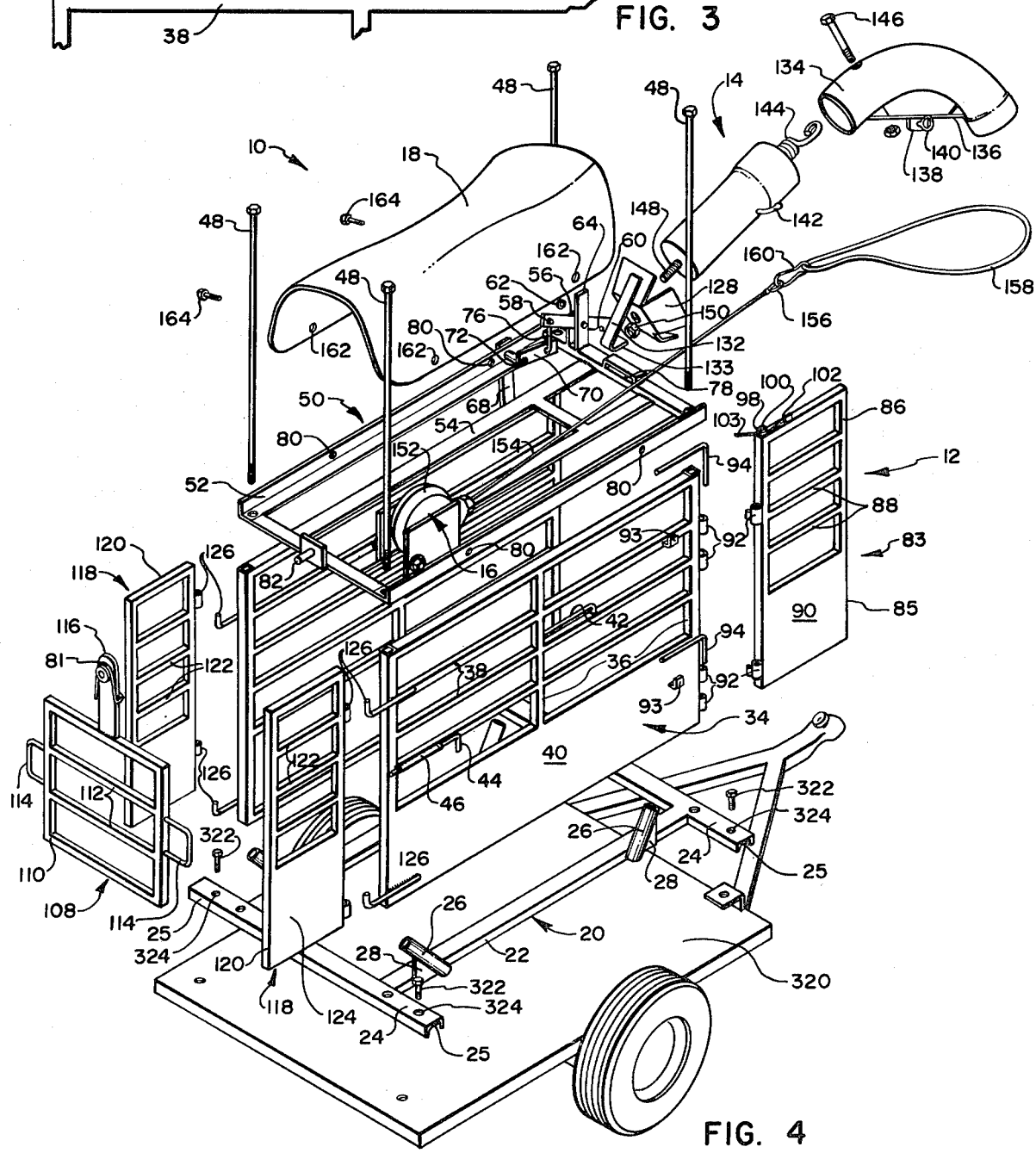
FIG. 4 is an exploded perspective view of one presently preferred embodiment of the calf-roping practice apparatus of the present invention illustrating a trailer which may be used to transport the apparatus.

As shown best in FIG. 4, rearward gate 108 of calf chute 12 comprises a rectangular frame 110 having a plurality of horizontal bars 112 therein. Advantageously, rearward gate 108 may also be provided with large loop handles 114 on either side thereof. A suspending strap 116 is connected to the top of rearward gate 108, and rearward gate 108 is rotatably suspended across the rearward entrance to calf chute 12 in some suitable manner. For example, the top of strap 116 may be provided with a hole which fits over a post 82 which is attached to the top 50 of calf chute 12. Suspending strap 116 may thereafter be secured on post 82 by means of a suitable keeper 81.

By grasping one of the loop handles 114 of rearward gate 108, rearward gate 108 may be pulled toward the side of calf chute 12, thereby opening the rearward entrance to calf chute 12. Rearward gate 108 may thereafter be secured in this open position by means of securement pins 44. When it is thereafter desired to close rearward gate 108, pins 44 may be disengaged thereby permitting rearward gate 108 to swing closed. Rearward gate 108 may thereafter be secured in its closed position by pushing both pins 44 toward the rearward end of calf chute 12.

Connecting panels 118 of calf chute 12 each comprise a substantially rectangular frame 120 having a plurality of horizontal bars 122 therein. Also, as with sides 34 and forward gate panels 84 and 85, connecting panels 118 may each be provided with a suitable shield plate 124 adjacent the lower portion thereof. Connecting panels 118 are connected in some suitable manner to the rearward end of sides 34. For example, connecting panels 118 may be connected to sides 34 by means of hinges 126 so as to be removable from sides 34. As set forth more fully below, connecting panels 118 assist the user in connecting the calf-roping practice apparatus 10 to a cattle chute in a stockyard or corral.

Spring-mounted neck structure 14 is connected to the forward end of calf chute 12 and comprises a socket 128 and a curved tube 134. Each of these members is discussed separately below.

Figure 3:
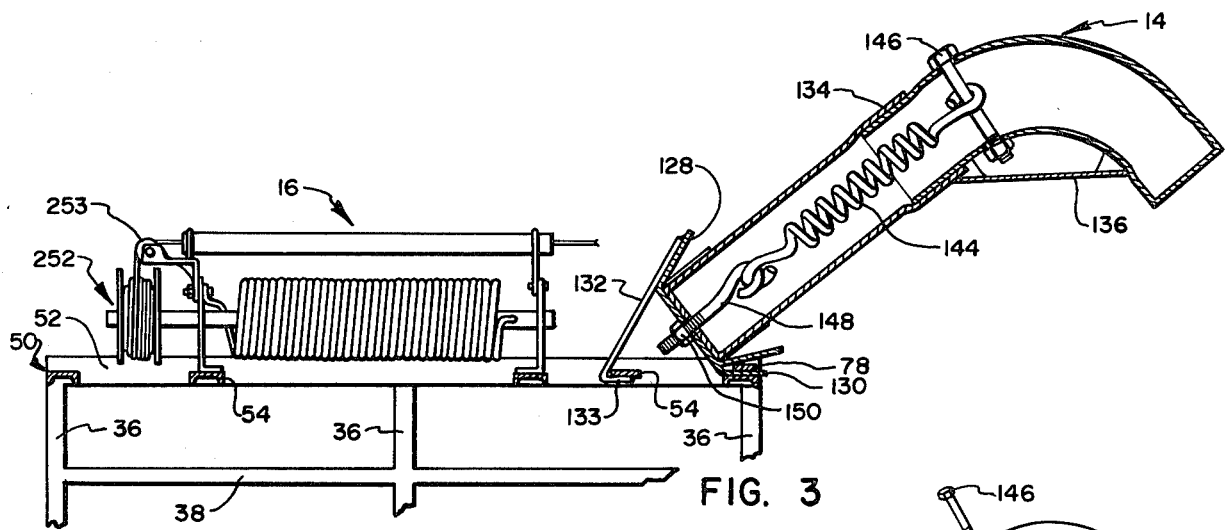
FIG. 3 is a partial side cross-sectional view of the calf-roping practice apparatus of the present invention showing a second preferred embodiment of the apparatus' take-up mechanism.

Socket 128 may have any suitable form. For example, socket 128 may be a substantially rectilinear dish-like structure having a substantially flat bottom surface. Socket 128 is connected to some suitable manner to the forward end of top 50 of calf chute 12. Although socket 128 could be rigidly connected to calf chute 12, it is presently preferred that socket 128 be easily detachable from calf chute 12 for reasons which will be discussed more fully below. Thus, for example, as depicted in FIGS. 1, 3 and 4, the forward end of top 50 of calf chute 12 could be provided with a suitable slot 78, and socket 128 could be provided with a tab 130 which may be received within slot 78. Preferably, socket 128 is also provided with a support arm 132 (see FIGS. 3 and 4) having a hook 133 on one end thereof, such that, when tab 130 is placed within slot 78, hook 133 of support arm 132 is simulatneously hooked around one of the support straps 54 of top 50 as depicted in FIG. 3. Importantly, when socket 128 is properly connected to top 50, the bottom surface of socket 128 makes an angle with the vertical of between 30 degrees and 60 degrees, as shown.

Curved tube 134 of neck structure 14 is a long, generally cylindrical member which is closed at one end and which forms a curved elbow adjacent such closed end. Curved tube 134 may be formed in two separable sections, as shown, or it may be formed as one continuous unit. A strap brace 136 spans the inward curve of the elbow in tube 134, and an L-shaped bracket 138 is rigidly attached to brace 136. An eyebolt 140 is connected to bracket 138 so as to extend outwardly from calf-roping practice apparatus 10, as shown in FIG. 2. Additionally, a hook 142 is secured to curved tube 134 for reasons which will become more fully apparent from the discussion which follows.

As illustrated in FIG. 3, the open end of curved tube 134 is secured within socket 128 by means of a high-tension spring 144. One end of high-tension spring 144 is attached to bolt 146 which passes through curved tube 134 adjacent the elbow thereof. The other end of spring 144 is connected to an eyebolt 148 which passes through socket 128 and is secured to socket 128 by means of a nut 150. With spring 144 thus connected, curved tube 134 is held securely within socket 128; and the tension in spring 144 may be adjusted by tightening or loosening nut 150.

One presently preferred embodiment for take-up means 16 is illustrated in FIG. 2. In this embodiment, a housing 152 containing a spring-biased spool is mounted to top 50 of calf chute 12. A cable 154, which is wound around the spring-biased spool, extends from housing 152 and has a loop 156 on the end thereof. A cord loop 158 is inserted through eyebolt 140 of curved tube 134, as shown, and cord loop 158 is connected to a clip 160. Clip 160 is thereafter connected to loop 156 and is initially placed over hook 142, as shown, so as to temporarily prevent cord loop 158 from being retracted toward housing 152 by cable 154.

A second embodiment of take-up means 16 is illustrated in FIG. 3. As shown, the second embodiment also comprises a spring biased spool 252 which is connected adjacent top 50 of calf chute 12 in some suitable manner. Significantly, due to the larger spring size and the lack of a small external housing, this embodiment of take-up means 16 provides a greater recoil force and a longer recoil distance than the embodiment illustrated in FIG. 2. A rope 314 (which is to be used during calf-roping practice), is wound around spool 252 and extends therefrom around one or more pulleys 253. Initially, once a sufficient length of rope 314 has been drawn from spool 252, rope 314 is releasably secured to hook 142 on neck structure 14, thereby temporarily preventing rope 314 from being retracted toward spool 252.

As depicted in FIGS. 1 and 4, structure 18 of calf-roping practice apparatus 10 is mounted on top of calf chute 12 and is formed so as to simulate a horse's back. For example, structure 18 may be formed of fiberglass in a mold which has been cast from a horse's back. Structure 18 may be secured to chute 12 in any suitable manner. For example, top 50 of calf chute 12 may be provided with holes 80 and structure 18 may be provided with holes 162. Structure 18 may then be removably attached to calf chute 12 by means of suitable pins 164. As discussed below, structure 18 enables a user to secure a saddle on top of calf chute 12 (see FIG. 1).

In use, calf-roping practice apparatus 10 is first moved adjacent a cattle chute in a stockyard or corral. Connecting panels 118 are then used to connect calf chute 12 of calf-roping practice apparatus 10 to the cattle chute. As depicted in FIG. 1, the user then secures his saddle 310 on top of structure 18 in some suitable manner. For example, saddle 310 may be secured by tying the cinch straps of saddle 310 to the horizontal tie bars 42 of calf chute 12. A string 312 is thereafter tied between the left stirrup of saddle 310 and the apparatus' outer lever arm 68. The user then takes his rope 314, which has been previously connected to take-up means 16 as described above, and mounts his saddle in a horse-like fashion.

Following the foregoing preliminary preparations, a calf is placed within calf chute 12, and rearward gate 108 of calf chute 12 is secured in a closed position by means of pins 44. When the user is ready to rope the calf, he kicks the left stirrup of saddle 310 toward the rear of apparatus 10, thereby pulling string 312 and outer lever arm 68. Latch arm 58 is thereby raised so as to release forward gate 83.

As forward gate 83 springs open, the calf runs out of calf chute 12 and is roped. When the take-up means 16 illustrated in FIG. 2 is used, the running calf soon pulls the clip 160 off of hook 142. Then when clip 160 reaches eyebolt 140 on neck structure 14, the calf is abruptly stopped. Thereafter, take-up means 16 maintains tension in rope 314, and the user may dismount his saddle in the appropriate manner. The tension in rope 314 assists the user in turning the calf onto its back, and the user then ties the calf, thereby completing the calf-roping event. The take-up means 16 illustrated in FIG. 3 works in substantially the same way, except that in such case the calf is stopped when the rope 314 has been fully extended from the spool 252.

Calf-roping practice apparatus 10 may be formed in any suitable manner and from a number of suitable materials. For example, calf chute 12 and neck structure 14 could be constructed of steel by means of welding, while structure 18 is formed of molded fiberglass. Preferably, calf-roping practice apparatus 10 is formed so as to be as lightweight as possible without sacrificing the necessary structural stability. Thus, calf-roping practice apparatus 10 may be formed using hollow metal members where appropriate.

As mentioned above, spring-mounted neck structure 14, take-up means 16, and structure 18 are preferebly detachable from calf chute 12. Thus, when apparatus 10 is not in use, calf chute 12 may function as a normal calf chute and may be so used in a rodeo or in a stockyard.

Further, in order to facilitate transportation and storage of apparatus 10, forward gate 83, rearward gate 108, and cattle chute connecting panels 118 may be detachable from calf chute 12. Additionally, base 20, sides 34, and top 50 of calf chute 12 may also be detachably connected to one another, as depicted in FIG. 4. In such case, calf chute 12 may be completely disassembled and and may thus be stored or transported in a relatively small area. Calf-roping practice apparatus 10 may also be provided with a suitable trailer 320, and practice apparatus 10 may be detachably connected to trailer 320 by means of pins 322.

From the foregoing description, it will be appreciated that the present invention has provided an apparatus and method for practicing calf-roping. Since the calf-roping practice apparatus of the present invention comprises a calf chute which may be surmounted by a saddle, the user may practice roping live calves without the need for using a roping horse. Also, it will be appreciated that the calf-roping practice apparatus of the present invention is relatively inexpensive to manufacture and maintain. Since the apparatus may include wheels or a suitable trailer, it may be easily transported from one place to another. Moreover, since the apparatus may be constructed so as to be capable of complete disassembly, the apparatus may be transported and stored in a relatively small area. In addition, the calf-roping practice apparatus of the present invention may serve as a calf chute when it is not being used to practice calf-roping skills. Thus, the apparatus does not take up needless space. Significantly, the present invention simulates the action of a roping horse in taking up the slack in the rope after the calf has been roped. Also, since the calf-roping apparatus of the present invention remains stationary (similar to a roping horse which is stopping just prior to the time at which the roper throws the rope), the calf roper may use this device to help improve his timing and roping accuracy. Thus, it will be appreciated that the present invention has provided a method for practicing calf-roping on live calves which simulates a real roping experience but which does not necessitate using a roping horse.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for practicing calf-roping, comprising:
    a chute, said chute including means for releasing a calf confined in the chute;
    means for surmounting the chute, said surmounting means simulating a horse's back and providing a seating area for a person; and
    means for attaching a roping rope to the chute.

2. An apparatus for practicing calf-roping as defined in claim 1 wherein the chute comprises a base, two sides, and a top which are detachably connected to one another.

3. An apparatus for practicing calf-roping as defined in claim 1 wherein the releasing means of the chute comprises as spring-loaded forward gate.

4. An apparatus for practicing calf-roping as defined in claim 3 wherein the releasing means of the chute further comprises a lever which triggers the spring-loaded forward gate so as to permit the forward gate to open.

5. An apparatus for practicing calf-roping as defined in claim 1 wherein the surmounting means comprises a curved structure connected on top of the chute which simulates a horse's back.

6. An apparatus for practicing calf-roping as defined in claim 1 further comprising a spring-mounted neck structure connected adjacent a forward end of the chute.

7. An apparatus for practicing calf-roping as defined in claim 1 further comprising wheels which are detachably connected to the chute such that the chute may be towed by a vehicle.

8. An apparatus for practicing calf-roping, comprising:
    a chute, said chute including means for releasing a calf confined in the chute;
    means for surmounting the chute, said surmounting means simulating a horse's back and providing a seating area for a person; and
    means, attachable to a roping rope, for automatically removing any slack in said rope after the rope is thrown around the calf.

9. An apparatus for practicing calf-roping as defined in claim 8 wherein the chute comprises a base, two sides, and a top which are detachably connected to one another.

10. An apparatus for practicing calf-roping as defined in claim 8 wherein the releasing means of the chute comprises as spring-loaded forward gate.

11. An apparatus for practicing calf-roping as defined in claim 10 wherein the releasing means of the chute further comprises a lever which triggers the spring-loaded forward gate so as to permit the forward gate to open.

12. An apparatus for practicing calf-roping as defined in claim 8 wherein the surmounting means comprises a curved structure connected on top of the chute which simulates a horse's back.

13. An apparatus for practicing calf-roping as defined in claim 8 wherein the slack removing means comprises a cable which is wound around a spring biased spool.

14. An apparatus for practicing calf-roping as defined in claim 8 wherein the slack removing means comprises a spring biased spool.

15. An apparatus for practicing calf-roping as defined in claim 8 further comprising a spring-mounted neck structure connected adjacent a forward end of the chute.

16. An apparatus for practicing calf-roping as defined in claim 8 further comprising wheels which are detachably connected to the chute such that the chute may be towed by a vehicle.

17. An apparatus for practicing calf-roping, comprising:
   a chute for confining a calf to be roped, said chute having a forward gate;
   a spring mounted neck structure connected adjacent a forward end of the chute;
   means for surmounting the chute, said surmounting means simulating a horse's back and providing a seating area for a person; and
   means, attachable to a roping rope, for automatically removing any slack in said rope after the rope is thrown around the calf.

18. An apparatus for practicing calf-roping as defined in claim 17 wherein the chute comprises a base, two sides, and a top which are detachably connected to one another and wherein the forward gate is detachably connected to the sides of the chute.

19. An apparatus for practicing calf-roping as defined in claim 18 wherein the forward gate of the chute is spring biased toward an open position and wherein the chute further comprises a latch which releasably secures the forward gate of the chute in a closed position.

20. An apparatus for practicing calf-roping as defined in claim 19 wherein said latch is connected to a lever such that a pulling force on the lever releases the forward gate, thereby permitting the forward gate to spring open.

21. An apparatus for practicing calf-roping as defined in claim 20 wherein the slack removing means comprises a spring biased spool.

22. An apparatus for practicing calf-roping as defined in claim 21 wherein the surmounting means comprises a curved structure which simulates a horse's back.

23. An apparatus for practicing calf-roping as defined in claim 22 wherein the curved structure is formed of fiberglass.

24. An apparatus for practicing calf-roping as defined in claim 23 wherein the spring-mounted neck structure comprises a socket and a hollow tube, one end of the hollow tube being secured within the socket by a high tension spring.

25. An apparatus for praciticing calf-roping as defined in claim 24 wherein the chute further comprises connecting panels detachably connected to the chute for connecting the chute to a cattle chute.

26. An apparatus for praciticing calf-roping as defined in claim 25 further comprising wheels detachably connected to the chute such that the chute may be towed by a vehicle.

27. A method for practicing calf-roping, comprising the steps of:
   obtaining a calf-roping practice apparatus, comprising: a chute, said chute including means for releasing
   a calf confined in the chute;
      means for surmounting the chute, said surmounting means simulating a horse's back and providing a seating area for a person; and
      means, attachable to a roping rope, for automatically removing any slack in said rope after the rope is thrown around the calf;
   operating the releasing means of the chute, thereby releasing the calf; and
   throwing the rope around the calf such that the slack removing means thereafter removes any slack from the rope.

28. A method for practicing calf-roping as defined in claim 27 wherein the releasing means of the chute comprises a forward gate which is spring-biased toward an open position and a latch which releasably secures said forward gate in a closed position.

29. A method for practicing calf-roping as defined in claim 28 wherein the latch of the releasing means is connected to a lever such that a pulling force on the lever releases the forward gate, thereby permitting the forward gate to spring open.

30. A method for practicing calf-roping as defined in claim 29 wherein the surmounting means of the calf-roping practice apparatus comprises a curved structure which simulates a horse's back and further comprising a saddle securing step after the apparatus obtaining step comprising securing a saddle on the curved structure.

31. A method for practicing calf-roping as defined in claim 30 wherein the releasing means of the chute further comprises a string tied between one of the stirrups of the saddle and the lever such that, when the stirrup is kicked toward a rearward end of the chute, the string exerts a pulling force on the lever and wherein the releasing means operating step comprises kicking the stirrup toward the rearward end of the chute.

* * * * *

UNITED STATES PATENT AND TRADEMARK OFFICE
CERTIFICATE OF CORRECTION

PATENT NO. : 4,470,373
DATED : September 11, 1984
INVENTOR(S) : Greg Kesler

It is certified that error appears in the above—identified patent and that said Letters Patent is hereby corrected as shown below:

Column 1, line 43, "considerably" should be --considerable--
Column 2, line 16, "on-going" should be --ongoing--
Column 2, line 53, "into" should be --onto--
Column 2, line 54, above mentioned" should be --above-mentioned--
Column 3, line 54 "to as" should be --so as--
Column 4, line 64, "calf roping" should be --calf-roping--
Column 5, line 14, "crossties" should be --cross ties--
Column 6, line 16, "sheild" should be --shield--
Column 6, line 56, "right gate panel 84" should be --right gate panel 85--
Column 7, line 39, "to some" should be --in some--
Column 9, line 34, "preferebly" should be --preferably--
Column 10, line 37, "as" should be --a--
Column 11, line 3, "as" should be --a--
Column 12, line 12, "praciticing" should be --practicing--
Column 12, line 16, "praciticing" should be --practicing--
Column 12, line 23, "a chute" should be preceded by the beginning of a new subparagraph
Column 12, lines 23-24, "releasing" should not be followed by a line return
Column 12, line 34, "throwing" should have only one subparagraph preceding it, not two Signed and Sealed this Fifth Day of March 1985

[SEAL]

Attest:

DONALD J. QUIGG

Attesting Officer   Acting Commissioner of Patents and Trademarks